(12) United States Patent
Tarnacki et al.

(10) Patent No.: US 9,243,750 B2
(45) Date of Patent: Jan. 26, 2016

(54) MULTI-USE CONTAINER FOR ENGINE MAINTENANCE KIT

(75) Inventors: Brian Tarnacki, White Lake, MI (US); Michael Proud, Brighton, MI (US); Jennifer J. Bontomasi, Grosse Pointe, MI (US)

(73) Assignee: Federal-Mogul Corporation, Southfield, MI (US)

( * ) Notice: Subject to any disclaimer, the term of this patent is extended or adjusted under 35 U.S.C. 154(b) by 2403 days.

(21) Appl. No.: 12/022,232

(22) Filed: Jan. 30, 2008

(65) Prior Publication Data

US 2008/0185070 A1 Aug. 7, 2008

Related U.S. Application Data

(60) Provisional application No. 60/887,941, filed on Feb. 2, 2007.

(51) Int. Cl.
*B65B 1/04* (2006.01)
*F16N 31/00* (2006.01)
*A47J 36/14* (2006.01)

(52) U.S. Cl.
CPC .............. *F16N 31/004* (2013.01); *A47J 36/14* (2013.01)

(58) Field of Classification Search
USPC ................. 141/297–300, 331–345, 363–366; 222/460, 462; 206/223, 327; 184/1.5
See application file for complete search history.

(56) References Cited

U.S. PATENT DOCUMENTS

| | | |
|---|---|---|
| 584,275 A | 6/1897 | Sevier |
| 3,016,133 A | 1/1962 | Jones |
| 3,554,369 A | 1/1971 | Paschke |
| 3,703,956 A | 11/1972 | Oswalt |
| 4,098,398 A | 7/1978 | Meyers |
| 4,125,207 A | 11/1978 | Ernst et al. |
| 4,239,130 A * | 12/1980 | Altadonna ..................... 222/131 |
| 4,296,838 A * | 10/1981 | Cohen ........................... 184/106 |
| 4,403,692 A | 9/1983 | Pollacco |
| 4,756,411 A | 7/1988 | Garland |
| 4,856,652 A | 8/1989 | Bowland |
| 4,887,717 A | 12/1989 | Secrest, Jr. |
| 4,974,647 A | 12/1990 | Eastom |
| 5,080,149 A | 1/1992 | Peoples |
| 5,092,457 A | 3/1992 | Islava et al. |

(Continued)

FOREIGN PATENT DOCUMENTS

| | | |
|---|---|---|
| JP | 62-030749 | 2/1987 |
| JP | 03-076521 | 7/1991 |

(Continued)

OTHER PUBLICATIONS

European search report PCT/US2008052757 mailed Oct. 23, 2012.

*Primary Examiner* — Jason K Niesz
(74) *Attorney, Agent, or Firm* — Robert L. Stearns; Dickinson Wright, PLLC

(57) ABSTRACT

An engine maintenance kit and multi-use container assembly (28). The multi-use container (28) includes a base (30) and a separable lid (32) that is fitted at its uppermost end with a pour spout (46). A funnel portion (50) is formed integrally in the lid (32) and serves to facilitate the filling of fresh, unused oil from a bottle (24) into an engine (12). The base (30) serves as an oil pan for capturing waste oil (56) during the maintenance process. Following an oil change, the lid (32) is returned to the base (30) for securely transporting the waste oil (56) to an appropriate collection center.

15 Claims, 6 Drawing Sheets

(56) References Cited

U.S. PATENT DOCUMENTS

| | | |
|---|---|---|
| 5,101,870 A | 4/1992 | Farris |
| D332,300 S * | 1/1993 | Eastom .................... D23/211.2 |
| 5,305,910 A | 4/1994 | Pollacco |
| 5,938,035 A | 8/1999 | Oglesby et al. |
| 6,085,806 A | 7/2000 | Davis et al. |
| 6,234,220 B1 | 5/2001 | Davis et al. |
| 6,318,417 B1 | 11/2001 | Davis et al. |
| 6,457,493 B1 | 10/2002 | Davis et al. |
| 6,742,551 B2 | 6/2004 | Davis et al. |
| 7,469,784 B1 * | 12/2008 | Bower ......................... 206/223 |

FOREIGN PATENT DOCUMENTS

| | | |
|---|---|---|
| JP | 2737791 B2 | 4/1998 |
| KR | 20-0155389 Y1 | 10/1999 |
| KR | 20-0201885 Y1 | 11/2000 |

* cited by examiner

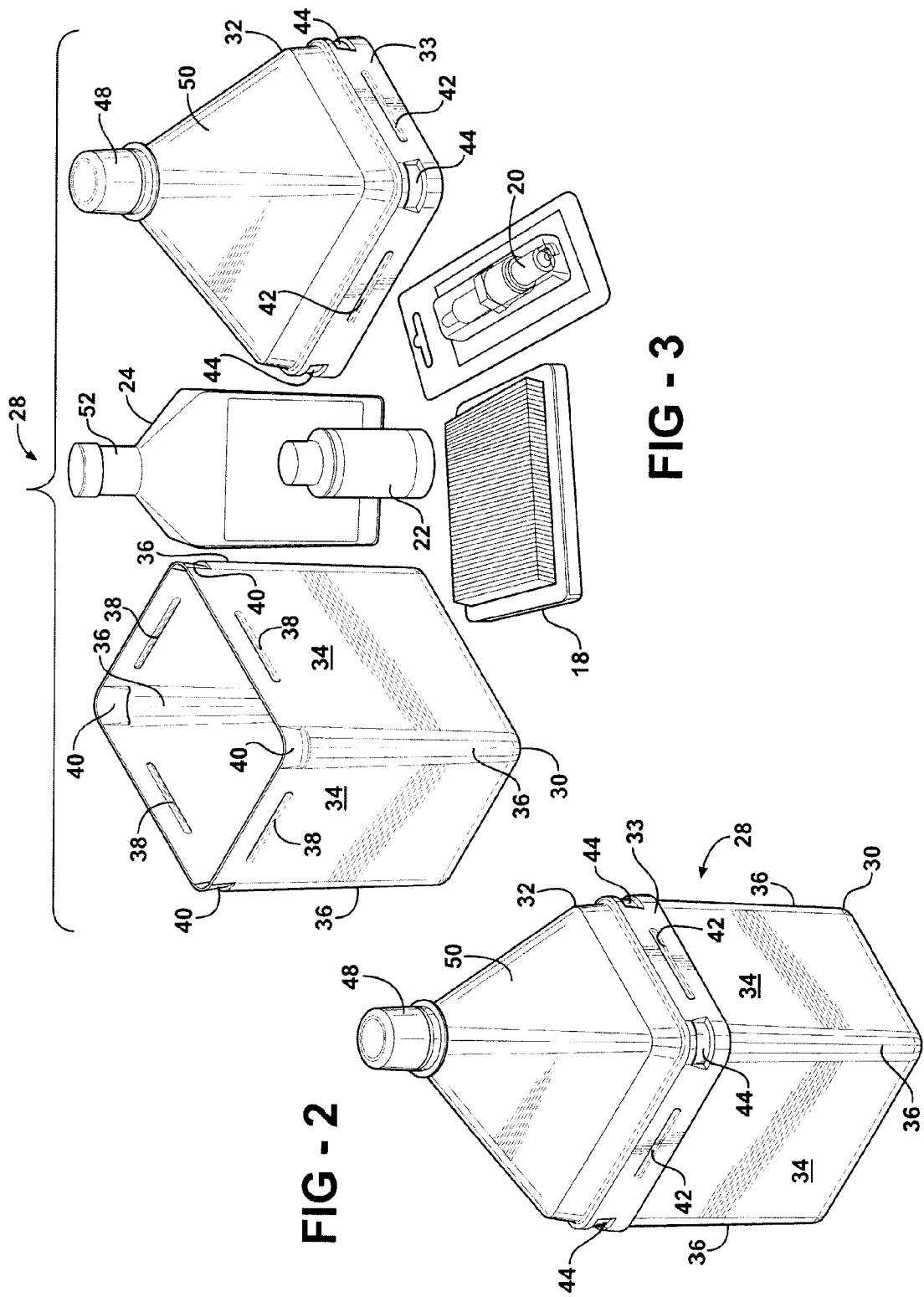

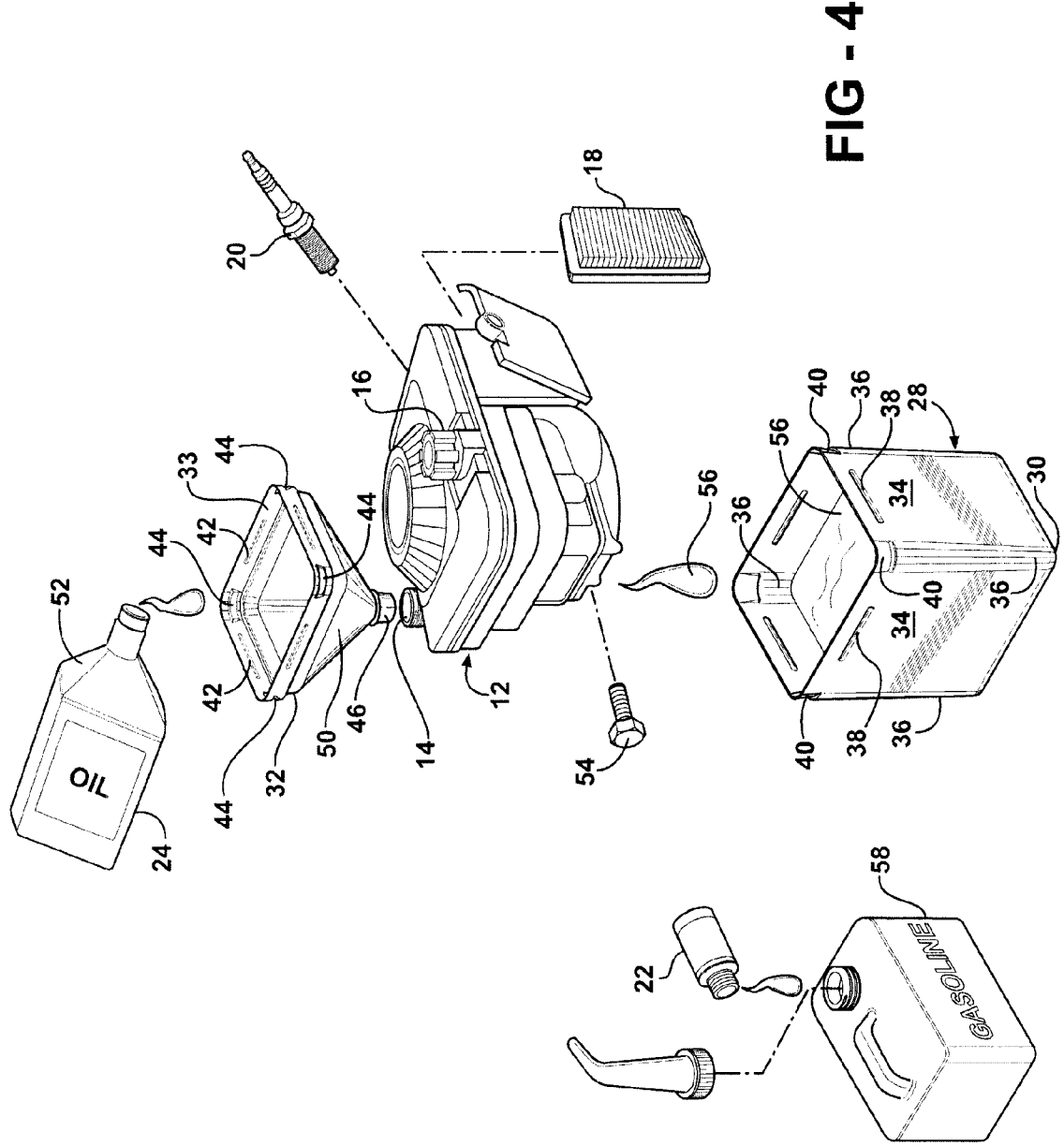

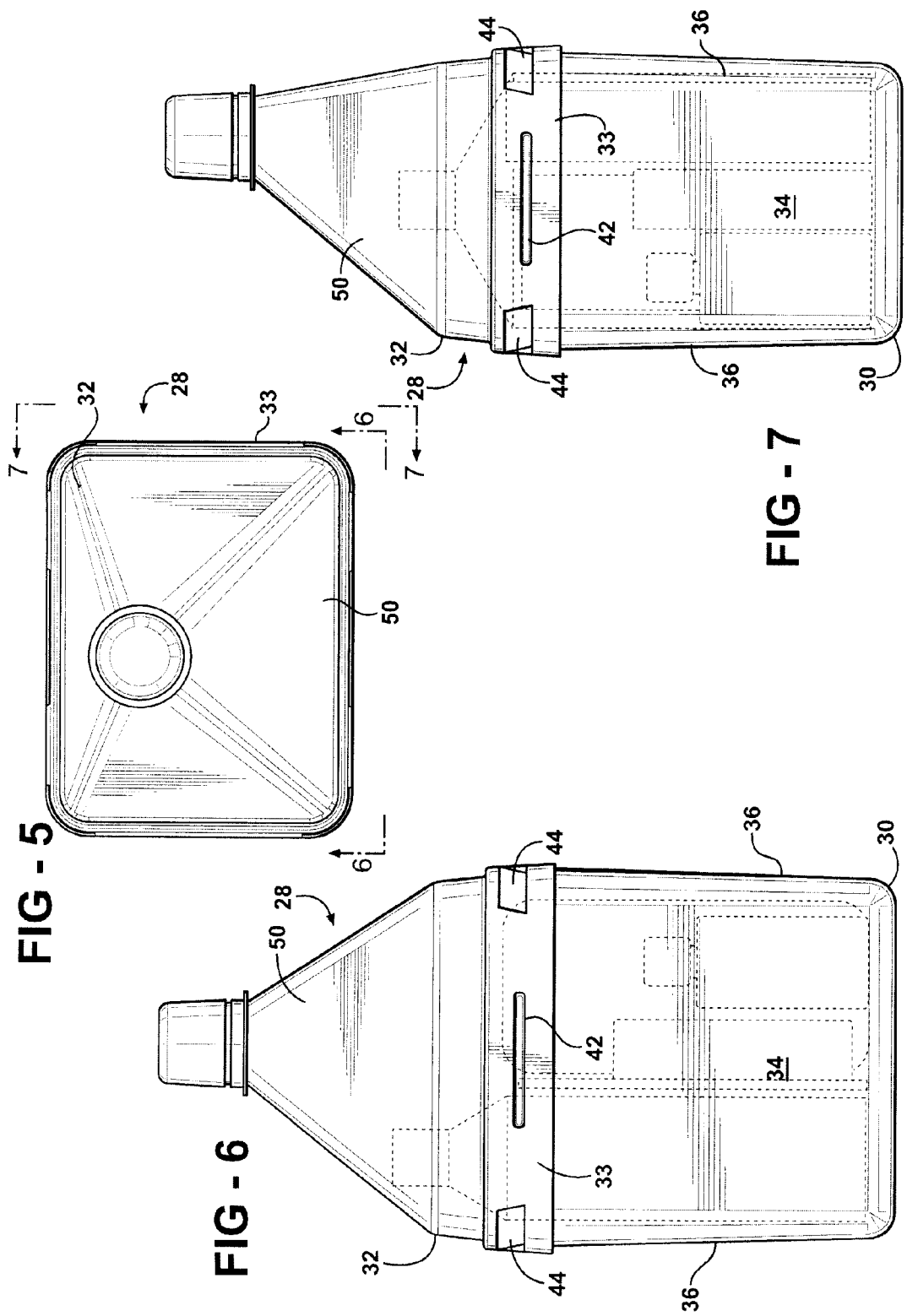

MULTI-USE CONTAINER FOR ENGINE MAINTENANCE KIT

CROSS REFERENCE TO RELATED APPLICATIONS

This application claims priority to U.S. Provisional Application No. 60/887,941 filed Feb. 2, 2007.

BACKGROUND OF THE INVENTION

1. Field of the Invention

The subject invention relates to a multi-use container for an engine maintenance kit and, more specifically, to such a container as used in the first instance for transporting engine tune-up components, and then in subsequent instances for funneling and collecting oil during an engine oil change process, and finally containing waste oil after the tune-up process.

2. Related Art

Small internal combustion engines are used in many applications including lawn mowers, generators, and the like. Properly serviced and maintained, these engines will last for many years and perform at peak efficiencies. Maintenance schedules are published by engine manufacturers, but have been found to be largely ignored by the vast majority of small engine owners and operators.

The small engine maintenance schedule typically includes several aspects. The crankcase oil must be changed regularly. Some manufacturers suggest oil change intervals after the first 5 hours of use and every 50 hours thereafter or once a season. The air filter should be changed regularly; for example, every 25 hours of operation or once per season. The spark plug should be changed at the recommended interval, which may be on the order of every 100 hours of service or once per season. Fuel additives should be intermixed with the engine's gasoline at the beginning and then again at the end of each season. Some small engines are designed to replace an oil filter at specified intervals.

For the sake of convenience, some retailers have assembled the basic components of a small engine maintenance kit into a single package. The components typically include a bottle of fresh, unused oil (typically 20 ounces or 0.6 liters for small engines), a spark plug, a bottle of fuel stabilizer, and an air filter. Optionally, the kit may include a spark plug wrench. On appropriate engine types, an oil filter may also be included in the kit. These components are, in most cases, packaged in a disposable cardboard container. Once the tune-up components have been used, the cardboard container is discarded. Thus, the cardboard container has but one purpose, and that is to house the kit components during shipping, handling, and point of sale.

Most small engine owners are reluctant to maintain their engines according to the manufacturer's recommended schedules. In part, the reason for this is a perceived inconvenience in the oil changing process. Many owners do not know where the oil drain plug is located or where new oil is filled into the crankcase. Many owners do not readily have an oil pan at hand, which is needed to collect the waste oil, nor a convenient way to transport the waste oil to an appropriate collection or recycling center.

The prior art has proposed various convenience kits in addition to those described above. For example, U.S. Pat. No. 5,305,910 to Pollacco discloses an engine oil container that includes an accessory funnel and drip pan. U.S. Pat. No. 5,101,870 to Farris discloses an accessory funnel that fits over the neck of a standard one quart sized oil bottle. U.S. Pat. No. 5,092,457 to Islava et al., discloses an engine oil change kit that includes a drip pan, gloves, and other accessory items. U.S. Pat. No. 5,080,149 to Peoples discloses a dual purpose engine oil container that includes a funnel but no drip pan or other tune-up accessory components. U.S. Pat. No. 4,856,652 to Bowland discloses an oil change kit including oil, filter, and drip pan but no funnel. U.S. Pat. No. 4,756,411 to Garland discloses an oil change kit including oil, filter, and drip pan but no funnel.

Accordingly, there exists a need in this field for improved convenience so that the do-it-yourself community will more frequently perform small engine tune-ups. Furthermore, there exists a need for an improved maintenance kit marketing strategy that will encourage do-it-yourself owners of small engines to perform maintenance at regularly scheduled intervals.

SUMMARY OF THE INVENTION

An engine maintenance kit and multi-use container assembly, according to the subject invention, comprises a container including a base and a lid. The base has bottom and side walls upstanding from the bottom to form a receptacle. A bottled quantity of unused engine oil is disposed in the base. The lid has a depending skirt overlapping the side walls for enclosing the unused engine oil in the base. The lid includes an integral pour spout and a funnel portion extending between the skirt and the spout. During an engine change operation, the base forms a drain pan for capturing waste engine oil. The lid can be reunited with the base for safe transport to a waste oil reclamation site. In other words, the lid with integrated funnel can be returned to a condition in which it encloses the receptacle portion of the base so that captured waste engine oil does not spill or splash during transport to a waste oil reclamation site.

According to another aspect of the invention, a method for changing the oil in an engine having a drain plug and a fill spout is provided. The method comprises the steps of: providing a multi-use container of the type including a base and a lid, the lid being formed with a funnel portion terminating in a pour spout; transporting a bottled quantity of unused engine oil in the multi-use container; removing the lid from the base of the multi-use container; emptying the contents from the base; positioning the empty base under the engine drain plug; removing the engine drain plug and thereby draining waste engine oil into the base; reinstalling the engine drain plug when substantially all of the waste engine oil has been drained from the engine; removing a cap from the funnel portion of the lid; inserting the funnel portion of the lid into the engine fill spout; pouring at least a portion of the unused engine oil into the engine through the funnel portion of the lid; securing the cap onto the funnel portion of the lid; reinstalling the lid onto the base of the multi-use container and thereby enclosing the waste engine oil therein; and transporting the multi-use container together with the waste engine oil enclosed therein to an approved waste oil reclamation site. Thus, the method of the subject invention is particularly environmentally friendly in that the funnel portion of the lid encloses the waste engine oil which is captured in the base of the multi-use container, thereby facilitating transport to an approved waste oil reclamation site.

BRIEF DESCRIPTION OF THE DRAWINGS

These and other features and advantages of the present invention will become more readily appreciated when considered in connection with the following detailed description and appended drawings, wherein:

FIG. 2 is a perspective view of an engine maintenance kit and multi-use container assembly according to the subject invention;

FIG. 3 is a view as in FIG. 2 depicting the subject multi-use container assembly wherein the lid is separated from the base, and the service components contained therein removed for display;

FIG. 4 is a highly illustrative view depicting an actual service operation wherein the engine oil, spark plug, and air cleaner of an engine are exchanged, while fuel stabilizer is added to a gasoline supply;

FIG. 5 is a top view of the engine maintenance kit and multi-use container assembly as shown in FIG. 2;

FIG. 6 is a front elevation view as taken generally along Lines 6-6 in FIG. 5;

FIG. 7 is a side elevation view as taken generally along Lines 7-7 in FIG. 5;

DETAILED DESCRIPTION OF THE PREFERRED EMBODIMENT

Figure 1:
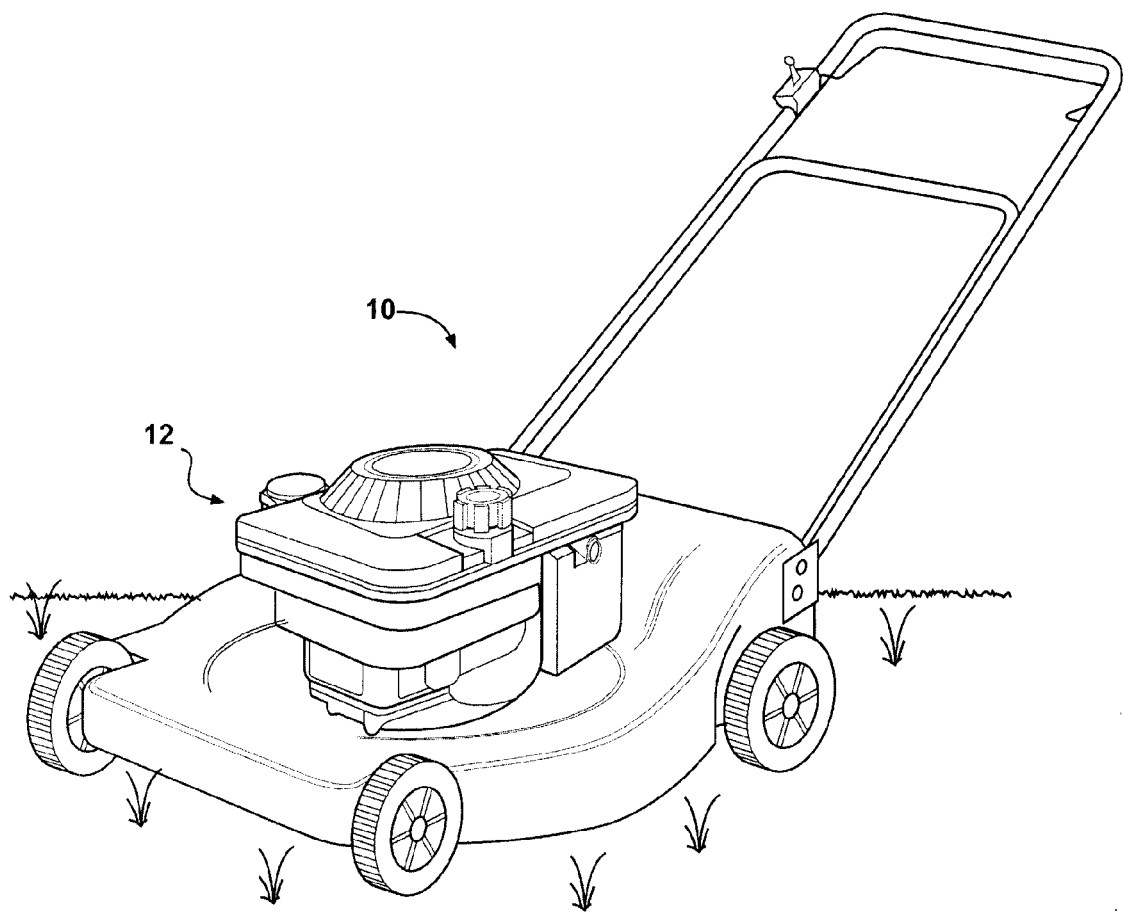
FIG. 1 is a simplified view of a lawn mower powered by a small engine of the type requiring routine maintenance.

Referring to the Figures, wherein like numerals indicate like or corresponding parts throughout the several views, an exemplary lawn mower is generally shown at 10 in FIG. 1. The lawn mower 10 is powered by a small internal combustion engine, generally indicated at 12. Such engines 12 are usually, but not always, of the four-stroke variety. As is well known in the art, such small engines 12 are commonly provided with an oil fill spout 14 as shown in FIG. 4. Gasoline is added to a small engine-mounted tank through a gas cap 16. Air aspirated into the engine 12 is passed through a filter 18, which may be of the cartridge paper type, reusable foam type, dual element type, or other construction. Fuel in the combustion chamber of the engine 12 is ignited by a spark plug 20.

Maintenance schedules are recommended by engine manufacturers and include complete crankcase oil changes after (for example) the first 5 hours of use and every 50 hours thereafter or once a season. Also recommended are air filter 18 changes every 25 hours (for example) of use or once a season. Spark plugs 20 should be changed every 100 hours (for example) of use or once a season. A fuel additive 22 should be intermixed with the gasoline at the beginning and end of the season. FIG. 3 depicts the replacement components typically used to maintain an engine 12. A bottle 24 of fresh, unused oil is provided, together with a small bottle of fuel additive 22, an air filter 18, and a spark plug 20. A spark plug wrench may be an included component of a typical maintenance kit, together with an engine oil filter for some applications.

Referring now to FIGS. 2 and 3, the subject invention is depicted as a multi-use container, generally indicated at 28. The multi-use container 28 is comprised of a large, cup-like base 30 of generally cubic construction; however, other geometries are possible, including tubular and prismatic shapes A lid 32 is provided with a skirt 33 about its lower periphery adapted for being received around (or into) the open top end of the base 30 in a sliding friction fit. More specifically, the base has at least three, but in this example four, discrete side walls 34 of generally planar surfaces that intersect one another in corner features 36. The side walls 34 upstand from a generally square or rectangular bottom which is not visible in any of the views, but clearly inferred. The bottom, combined with the interconnected side walls 34, form a receptacle.

The upper extremity of the side walls 34, near an open top edge of the base 30, are provided with a plurality of integrally formed deformations 38 which, as shown in FIG. 3, may comprise short channels extending horizontally or parallel to the open top edge of the base 30. Corner deformations 40 are likewise formed integrally in the corner features 36. The deformations 38, 40 are intended to interlock with complementary upsets 42 formed integrally in the skirt 33 of the lid 32. Likewise, corner upsets 44 and the corresponding corner features of the skirt 33 interlock with the corner deformations 40 of the side walls 34. Thus, when the lid 32 is received around (or into) the open top end of the base 30 in a sliding friction fit, the deformations 38, 40 interlock with the upsets 42, 44, thereby enhancing the frictional grip and better securing the lid 32 to the base 30.

The lid 32 includes, at its uppermost end, a pour spout 46. In the preferred embodiment, the pour spout 46 is externally threaded to receive a removable cap 48. However, other techniques can be used to secure the cap 48 to the pour spout 46 without threads, including friction fit and bayonet fittings, for examples. A funnel portion 50 extends between the skirt 33 and the pour spout 46 in a tapering, converging construction. The funnel portion 50 is an integral formation of the lid 32.

The base 30 is sized and shaped so as to snugly receive therein a fresh, unused oil bottle 24, a small bottle of fuel additive 22, a spark plug 20 (in cardboard packaging), and an air filter 18. As perhaps best shown in FIGS. 6 and 7, the neck 52 of the fresh oil bottle 24 is shaped for easy pouring, enclosed with its own screw-on cap. The tower-like neck 52 and cap of the oil bottle 24 accommodate a nesting orientation within the conforming shape of the lid 32, which helps secure the bottle 24 in position for shipping and handling. In other words, considering all of the components of a typical engine maintenance kit, the oil bottle 24 is typically largest, particularly in terms of its height. The typical oil bottle 24 is so tall, in fact, that its neck 52 stands higher than the side walls 34 of the base 30 when disposed in the receptacle portion of the base 30. For this reason, the funnel portion 50 of the lid 32 is intentionally shaped to complement the tower-like neck 52 and its cap, thereby allowing the multi-use container 28 to adopt the smallest possible volumetric expression. In FIG. 5, a top view of the container assembly 28 reveals that the spout 46 of the lid 32 is actually offset so that it lies generally centered over the tower-like neck 52 and cap of the fresh oil bottle 24. Again, this relates to efficient packaging.

The tune-up components 18, 20, 22, 24 enclosed within the multi-use container 28 are arranged, therefore, so that the bottle 24 of unused oil is located along a centerline, directly below the spout 46 as viewed in FIG. 5. In this fashion, the air filter 18 is disposed on one side of the unused oil bottle 24, whereas the fuel additive 22 and the spark plug 20 are located on the other side of the oil bottle 24. This arrangement of components necessitates an asymmetrical construction of the spout portion 46 of the lid 32 and also reliably nestles all of the necessary tune-up components 18-24 within the multi-use container 28 for shipping and handling purposes. Additional maintenance components (such as an oil filter, spark plug wrench, etc.) can be packed into the container 28 on either side of the oil bottle 24, where available space can be found.

Although not shown, an adhesive or shrink-wrap style band may be applied between the lid 32 and the base 30 at the location of their intersection to provide a secure, tamper-proof connection for the multi-use container 28 during shipping, handling, and retail sales events. The protective band would be removed by the consumer in order to remove the lid 32 in the first instance. It should be noted that, with respect to the fully assembled engine maintenance kit and multi-use container assembly 28, as illustrated in FIGS. 6 and 7, dimensional relationships are presented as merely exemplary between the various components.

Figure 8:
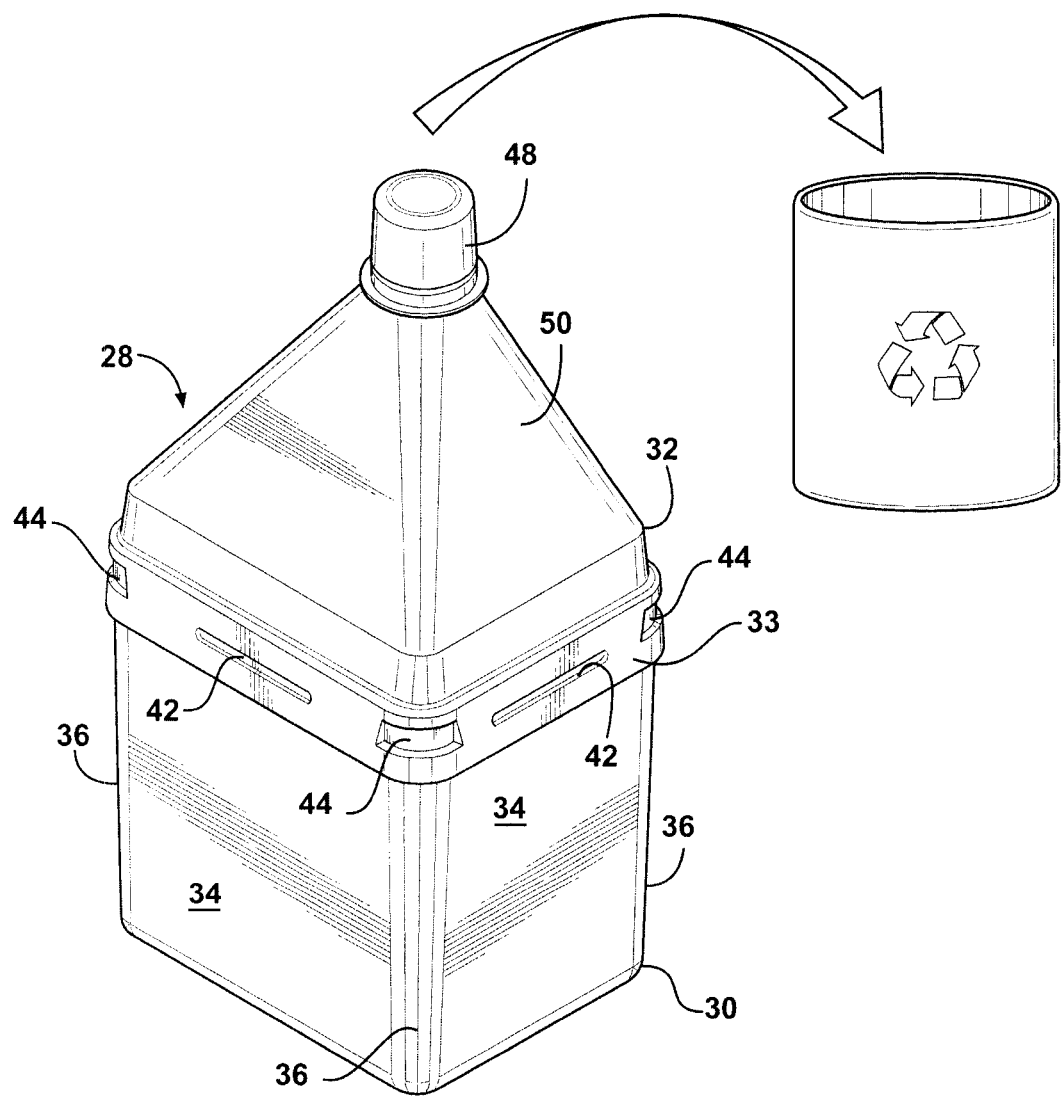
FIG. 8 is an illustrative view depicting the transportation of the subject multi-use container together with waste engine oil enclosed therein to a waste oil reclamation site.

FIG. 4 illustrates a typical maintenance schedule, wherein an oil drain plug 54 is removed from the engine crankcase so that used, waste motor oil 56 drains therefrom under the influence of gravity. The waste motor oil 56 is collected in the empty base 30. Once all, or substantially all, of the waste oil 56 has been drained from the engine 12, the drain plug 54 is reinstalled and fresh oil from the bottle 24 is poured into the engine fill spout 14. During this operation, the lid 32 can be inverted and its cap 48 removed from the pour spout 46 for insertion into the oil fill spout 14. By pouring the fresh oil first into the inverted lid 32, it functions as a funnel to provide spill-proof replacement of oil in the engine 12. Once the fresh oil filling operation is completed, the lid 32 is recapped 48 and then returned to the base 30 and secured thereon via the mating interconnection fit of its skirt 34 about the exterior (or interior) of the open top of the base 30. The spout cap 48, when secured to the spout 46, thus encloses the waste oil 56 inside the multi-use container 28 to enable eco-safe transport of the waste oil 56 to an appropriate collection center. This is depicted in FIG. 8. During the maintenance process, a new spark plug 20 is installed in the engine 12, together with a new air filter 18. At appropriate maintenance intervals, fuel stabilizer is poured from the fuel additive bottle 22 into a suitable gasoline container 58. The treated fuel is then transferred into the fuel tank of the engine 12.

Figure 9:
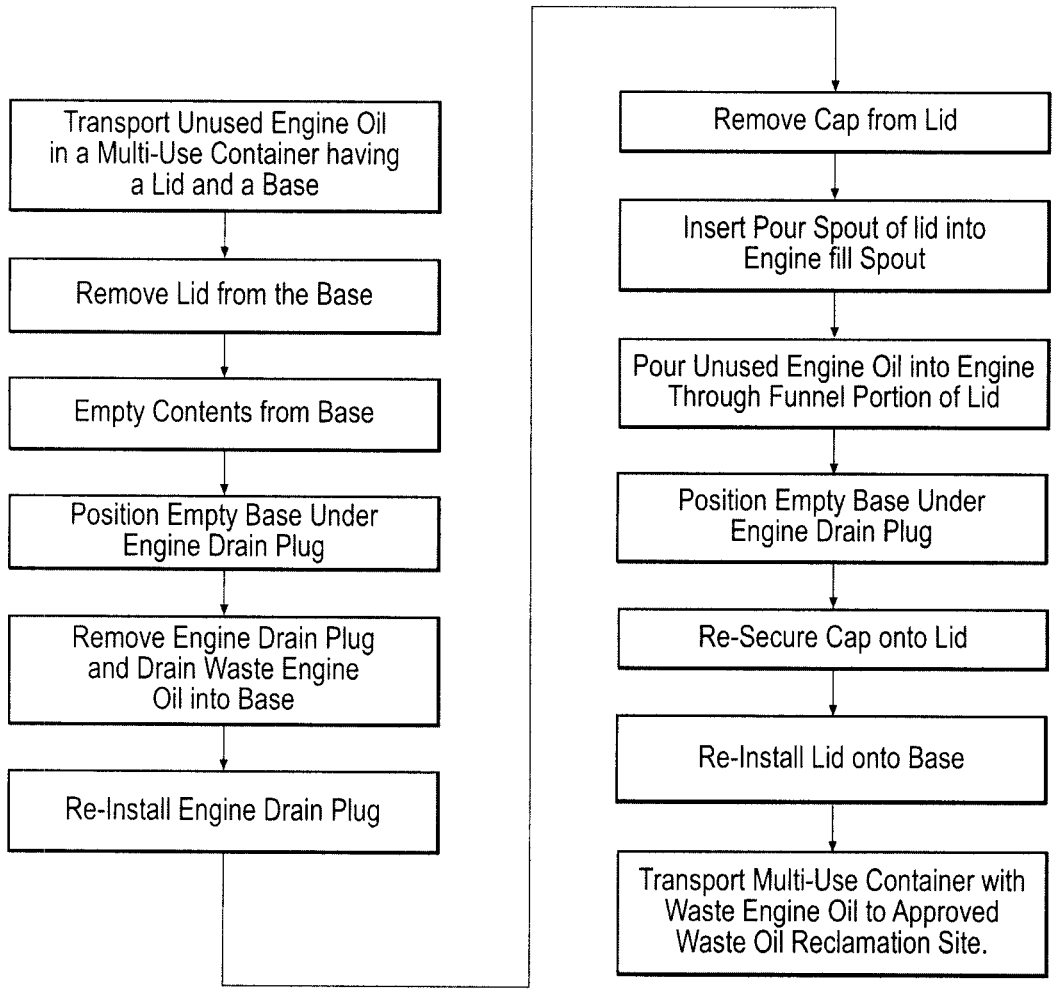
FIG. 9 is a simplified flow diagram describing a typical sequence of events in connection with the method of this invention.

The subject invention also contemplates a method for changing the oil in an engine 12 having a drain plug 54 and a fill spout 14. The method is illustrated schematically in FIG. 9. A multi-use container 28 of the type described above, including a base 30 and a lid 32, the lid 32 being formed with an integral funnel portion 50 terminating in a pour spout 46, is provided. Unused engine oil in a bottle 24 is transported in the multi-use container 28, together with an optional variety of tune-up components which may include an air filter 18, a spark plug 20, fuel additive 22, a spark plug wrench, an oil filter, and the like. The transportation may be from point-of-purchase to point-of-use in the context of a consumer. Prior to commencing the engine maintenance operation, the lid 32 must be removed from the base 30 and the contents 18-24 emptied from the base 30. The empty base 30 is then positioned under the engine oil drain plug 54 so that, once the drain plug 54 is removed, waste engine oil 56 can drain into the base 30. Once all, or substantially all, of the waste engine oil 56 has been captured in the base 30, the drain plug 54 is reinstalled in the engine 12. Next, the lid 32 is inverted and the cap on the pour spout 46 removed. Then, the pour spout 46 is inserted into the engine fill spout 14. All, or perhaps only an appropriate portion, of fresh, unused oil from the bottle 24 is poured into the engine 12 through the funnel portion 50 of the lid 32. Once this operation is complete, the cap 48 is re-secured to the pour spout 46, such as by screwing together complementary thread forms, and then the lid 32 reinstalled onto the base 30. Thus, the waste oil 56 is enclosed inside the multi-use container 28. Subsequently, the multi-use container 28, together with the waste engine oil 56 therein, is transported to a waste reclamation site as depicted in FIG. 8.

Of course, additional steps in the method may be accomplished to perfect a method for changing the oil in an engine 12, including reinstalling the lid 32 to the base 30 by selectively interlocking deformations 38, 40 with complementary upsets 42, 44 formed in the lid 32. Additionally, the step of emptying the contents from the base 30 may include removing a spark plug 20, removing an air filter 18, and/or removing a fuel additive 22, with subsequent operations carried out to service the engine 12 with these components.

Accordingly, the subject multi-use container 28 provides a convenient, all-in-one kit for performing a small engine 12 tune-up. The multi-use container 28 provides both the collection oil pan and a pouring spout during the oil change operation, together with an eco-safe container for transporting waste motor oil 56 to an approved collection center.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A small engine maintenance kit and multi-use container assembly, said assembly comprising:
   a container including a base and a lid;
   said base having a bottom and side walls upstanding from said bottom to form a receptacle;
   a bottle of unused engine oil disposed in said base, said bottle including an upstanding neck and a cap;
   said lid having a depending skirt mating with said side walls for enclosing said unused engine oil in said base;
   and said lid including a pour spout and an integral funnel portion extending between said skirt and said spout, wherein said base forms a drip pan for capturing waste engine oil that may be subsequently enclosed by said funnel portion of said lid for safe transport to a waste oil reclamation site;
   said cap of said bottle extending into said funnel portion of said lid.

2. The assembly of claim 1, further including a cap resealably connected to said spout.

3. The assembly of claim 2, wherein said spout includes external male thread forms and said cap includes internal female thread forms.

4. The assembly of claim 1, wherein said side walls include a plurality of deformations selectively inter-lockable with complementary upsets in said skirt.

5. The assembly of claim 1, wherein said side walls include at least three discrete, generally planar walls separated by corner features.

6. The assembly of claim 1, wherein said pour spout of said lid is asymmetrically disposed relative to aid side walls to accommodate said bottled quantity of unused engine oil in aid base.

7. The assembly of claim 1, further including a spark plug disposed in said receptacle portion.

8. The assembly of claim 1, further including an air cleaner disposed in said receptacle portion.

9. The assembly of claim 1, further including a bottled quantity of fuel stabilizer disposed in said receptacle.

10. A method for changing the oil of a small engine having a drain plug and a fill spout, said method comprising the steps of:

providing a multi-use container of the type including a base and a lid, the lid being formed with an integral funnel portion terminating in a capped pour spout;

transporting a bottle of unused engine oil in the multi-use container, the bottle having an upstanding neck and a cap extending into the funnel portion of the lid;

removing the lid from the base of the multi-use container;

emptying the contents from the base;

positioning the empty base under the engine drain plug;

removing the engine drain plug and thereby allowing waste engine oil to drain into the base;

reinstalling the engine drain plug when substantially all of the waste engine oil has been drained from the engine;

removing a cap from the pour spout of the lid;

inserting the pour spout of the lid into the engine fill spout;

pouring at least a portion of the unused engine oil into the engine through the funnel portion of the lid;

re-securing the cap onto the pour spout of the lid;

reinstalling the lid onto the base of the multi-use container and then thereby enclosing the waste engine oil therein; and transporting the multi-use container, together with the waste engine oil enclosed therein, to an approved waste oil reclamation site.

11. The method of claim 10, wherein said step of reinstalling the lid onto the base includes selectively interlocking deformations in the base with complementary upsets in the lid.

12. The method of claim 10, wherein said step of removing the cap includes unscrewing thread forms.

13. The method of claim 10, wherein said step of emptying the contents from the base includes removing a spark plug.

14. The method of claim 10, wherein said step of emptying the contents from the base includes removing an air cleaner from said receptacle portion.

15. The method of claim 10, wherein said step of emptying the contents from the base includes removing a bottled quantity of fuel stabilizer.

* * * * *